(12) United States Patent
Kim (10) Patent No.: US 10,256,451 B2
(45) Date of Patent: Apr. 9, 2019

(54) BATTERY PACK

(71) Applicant: SAMSUNG SDI CO., LTD., Yongin-si, Gyeonggi-do (KR)

(72) Inventor: Hyun Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 156 days.

(21) Appl. No.: 15/212,308

(22) Filed: Jul. 18, 2016

(65) Prior Publication Data

US 2017/0054126 A1    Feb. 23, 2017

(30) Foreign Application Priority Data

Aug. 18, 2015  (KR) .................. 10-2015-0116023

(51) Int. Cl.
*H01M 2/10* (2006.01)
*H01M 2/20* (2006.01)
*H01M 2/30* (2006.01)

(52) U.S. Cl.
CPC ............. *H01M 2/202* (2013.01); *H01M 2/30* (2013.01); *H01M 2/1016* (2013.01)

(58) Field of Classification Search
CPC ....... H01M 2/1016; H01M 2/202; H01M 2/30
See application file for complete search history.

(56) References Cited

U.S. PATENT DOCUMENTS

| 8,114,540 | B2 | 2/2012 | Trester et al. | |
|---|---|---|---|---|
| 2013/0309539 | A1* | 11/2013 | Yoshioka | H01G 11/52 |
| | | | | 429/99 |
| 2014/0255748 | A1* | 9/2014 | Jan | H01M 2/202 |
| | | | | 429/120 |
| 2015/0155533 | A1* | 6/2015 | Kim | H01M 2/30 |
| | | | | 429/99 |
| 2015/0171400 | A1* | 6/2015 | Shin | H01M 2/1077 |
| | | | | 429/160 |

FOREIGN PATENT DOCUMENTS

| KR | 10-2011-0060480 | A | 6/2011 |
|---|---|---|---|
| KR | 2011-0060480 | * | 6/2011 |
| KR | 10-2011-0119698 | A | 11/2011 |
| KR | 10-2012-0077082 | A | 7/2012 |
| KR | 10-2014-0006410 | A | 1/2014 |

OTHER PUBLICATIONS

English translation of KR Publicatio 2011-0060480, Jun. 2011.*

* cited by examiner

*Primary Examiner* — Brittany L Raymond
(74) *Attorney, Agent, or Firm* — Lee & Morse, P.C.

(57) ABSTRACT

A battery pack includes a plurality of secondary batteries and a plurality of bus bars. The secondary batteries are connected to each other in series and in parallel. Each of the secondary batteries includes first and second electrode terminals. Each of the bus bars electrically connects one of the secondary batteries to a neighboring one of the secondary batteries. The bus bars include a first bus bar having a first sectional area and a second bus bar having a second sectional area different from the first sectional area.

17 Claims, 9 Drawing Sheets

BATTERY PACK

CROSS-REFERENCE TO RELATED APPLICATION

Korean Patent Application No. 10-2015-0116023, filed on Aug. 18, 2015, and entitled, "Battery Pack," is incorporated by reference herein in its entirety.

BACKGROUND

1. Field

One or more embodiments described herein relate to a battery pack.

2. Description of the Related Art

A secondary battery is a rechargeable energy source that may be used to power a variety of systems and devices. Examples include mobile terminals and electric and hybrid vehicles. Cellular phones and other small mobile devices may operate for a predetermined time based on the power output and capacity of a single secondary battery. When long-time and high-power driving is required (e.g., such as in the case of electric or hybrid vehicles), a large-capacity battery pack may be used. The battery pack may be equipped with multiple secondary batteries electrically connected together. The output voltage and current of the battery pack may be proportional to the number of batteries in the pack.

SUMMARY

In accordance with one or more embodiments, a battery pack includes a plurality of secondary batteries connected to each other in series and in parallel, each of the secondary batteries including a first electrode terminal and a second electrode terminal; and a plurality of bus bars, each of the bus bars electrically connecting one of the secondary batteries to a neighboring one of the secondary batteries, wherein the bus bars include a first bus bar having a first sectional area and a second bus bar having a second sectional area larger than the first sectional area.

The secondary batteries may be included in at least two parallel groups connected to each other in parallel, and the at least two parallel groups may be connected to each other in series. The first bus bar may connect, in parallel, the secondary batteries to each other in the parallel groups, and the second bus bar may electrically connect the at least two parallel groups to each other. Each of the bus bars may include a pair of blade portions extending from a bent portion, and the blade portions may be connected to a first or a second electrode terminal of each of the secondary batteries.

A thickness of the bent portion of the second bus bar may be greater than that of the bent portion of the first bus bar. A width of the bent portion of the second bus bar may be greater than that of the bent portion of the first bus bar. The second bus bar include an extending portion extending from the bent portion in a second direction crossing extending directions of the blade portions. A blade portion of one of the bus bars and a blade portion of a neighboring one of the bus bars may be spaced apart from each other.

Each of a first electrode terminal and a second electrode terminal of the secondary battery may include an upwardly extending fastening terminal, and each of the blade portions of the bus bars may include a penetration hole through which the fastening terminal passes.

A blade portion of one of the bus bars and a blade portion of a neighboring one of the bus bars may be superimposed, and one fastening terminal may pass through the blade portions of both of the bus bar and the neighboring one of the bus bars. The blade portion of the bus bar may include at least one groove and at least one protrusion, and the protrusion of the blade portion of the bus bar may be inserted into the groove of the blade portion of the neighboring one of the bus bars. The protrusion of the blade portion of the bus bar and the protrusion of the blade portion of the neighboring one of the bus bar may be connected to the first electrode terminal or the second electrode terminal of the secondary battery by a single welding line.

In accordance with one or more other embodiments, an apparatus includes a first bus bar; and a second bus bar, wherein the first bus bar is electrically connected to an electrode terminal of a first battery and an electrode terminal of a second battery, and the second bus bar is electrically connected to the electrode terminal of the second battery and an electrode terminal of a third battery, and wherein the first bus bar has a first section having a first thickness overlapping a space between the electrode telininals of the first and second batteries and the second bus bar has a second section having a second thickness overlapping a space between the electrode terminals of the second and third batteries.

Each of the first and second bus bars may include third and fourth sections contacting respective ones of the electrode terminals, and wherein the first and second sections are above the third and fourth sections. The second bus bar may connect the electrodes of the second and third batteries in series. The second thickness may be greater than the first thickness. The first bus bar may not overlap the second bus bar. The first bus bar may overlap the second bus bar.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 1:
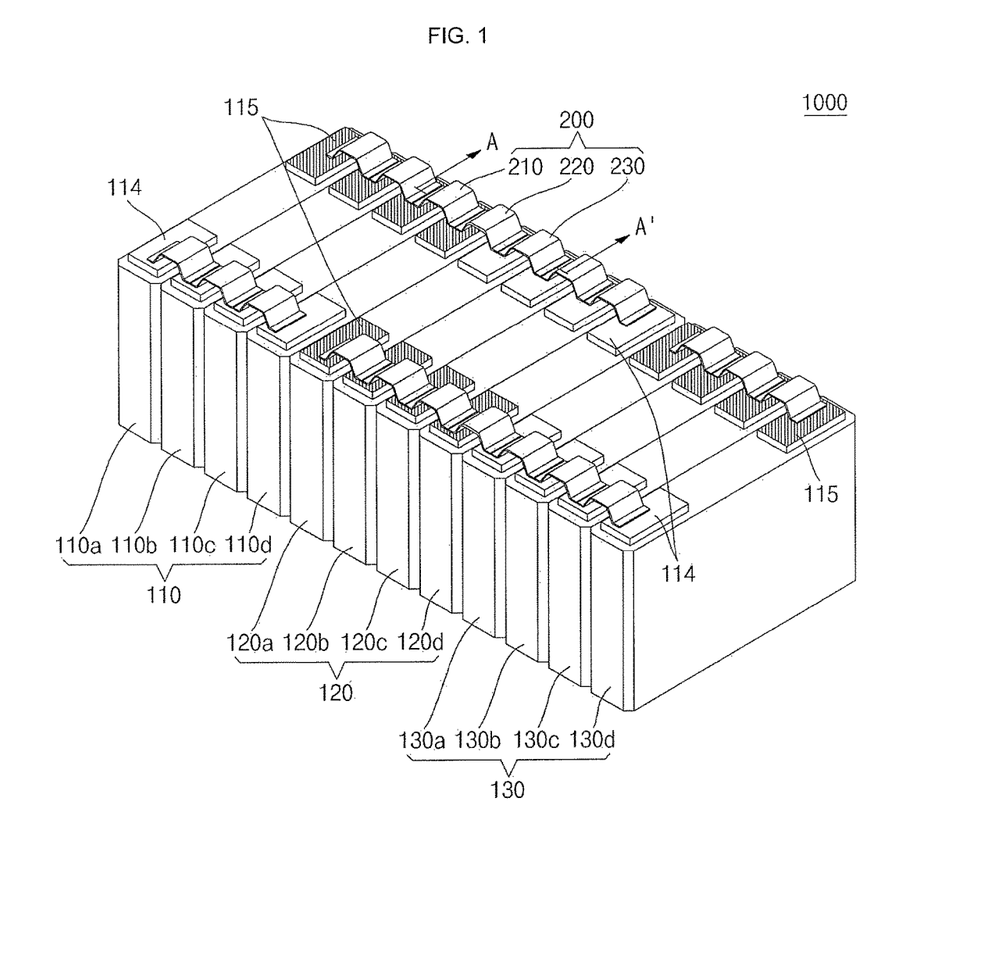
FIG. 1 illustrates an embodiment of a battery pack.
Figure 2:
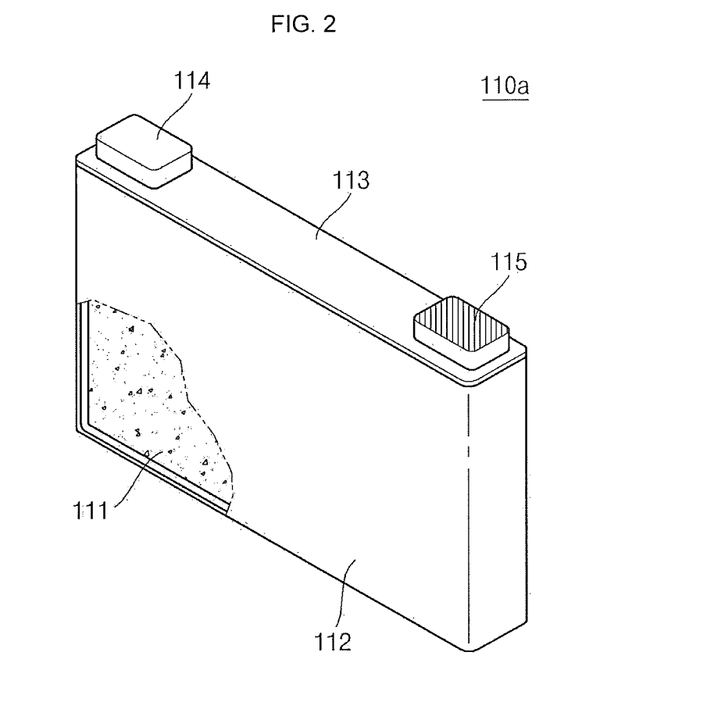
FIG. 2 illustrates an embodiment of a secondary battery.
Figure 3:
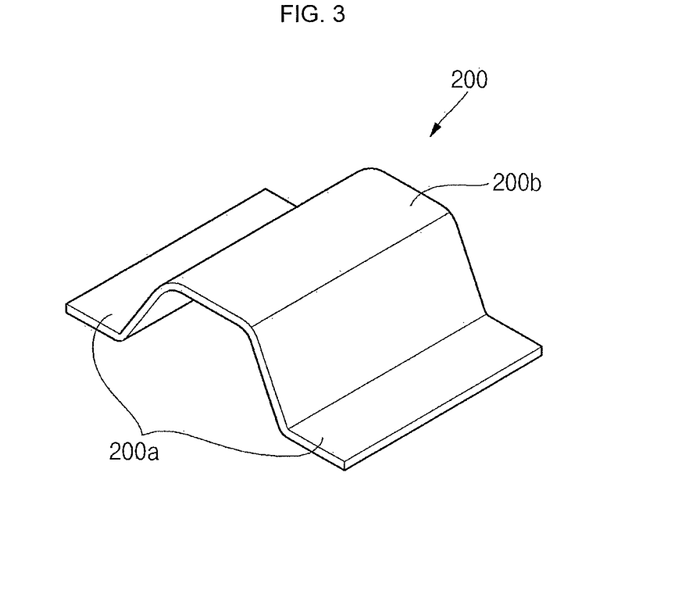
FIG. 3 illustrates an embodiment of a bus bar.
Figure 4:
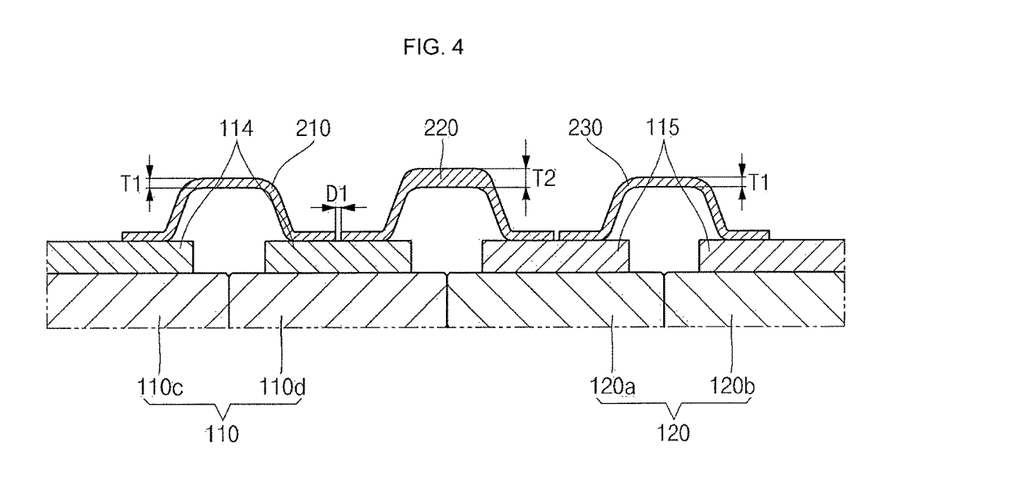
FIG. 4 illustrates a portion of the battery pack along section line A-A' in FIG. 1.
Figure 5:
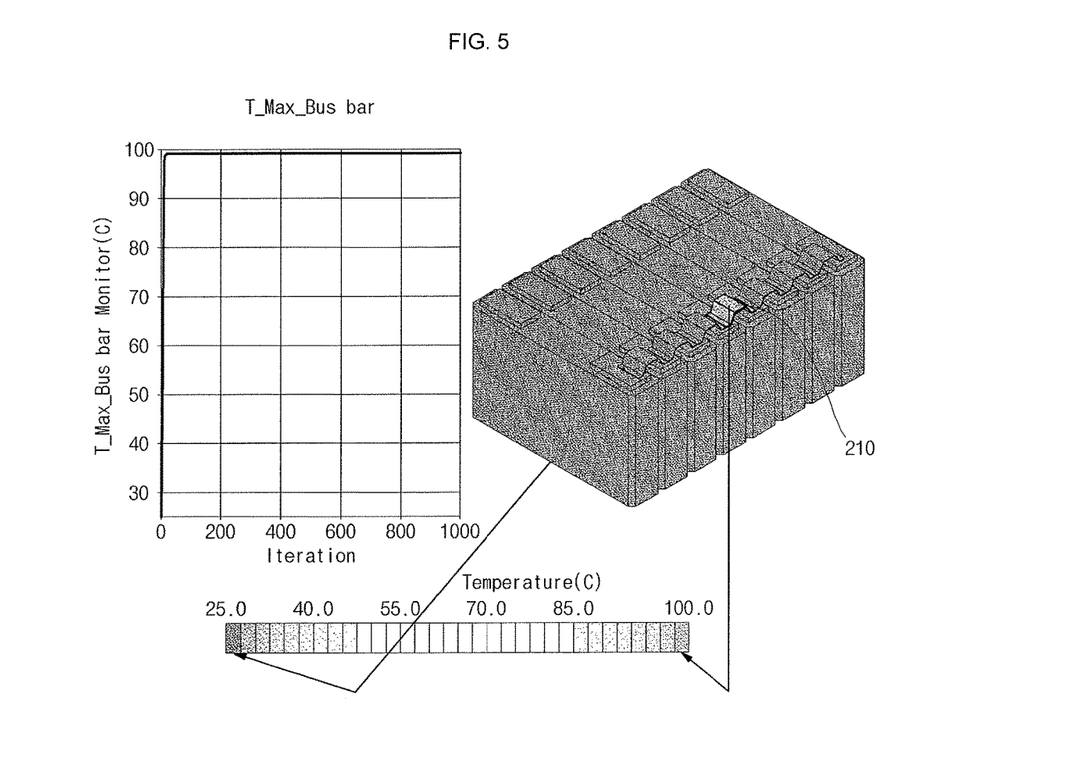
FIG. 5 illustrates a temperature distribution of one type of bus bar.
Figure 6:
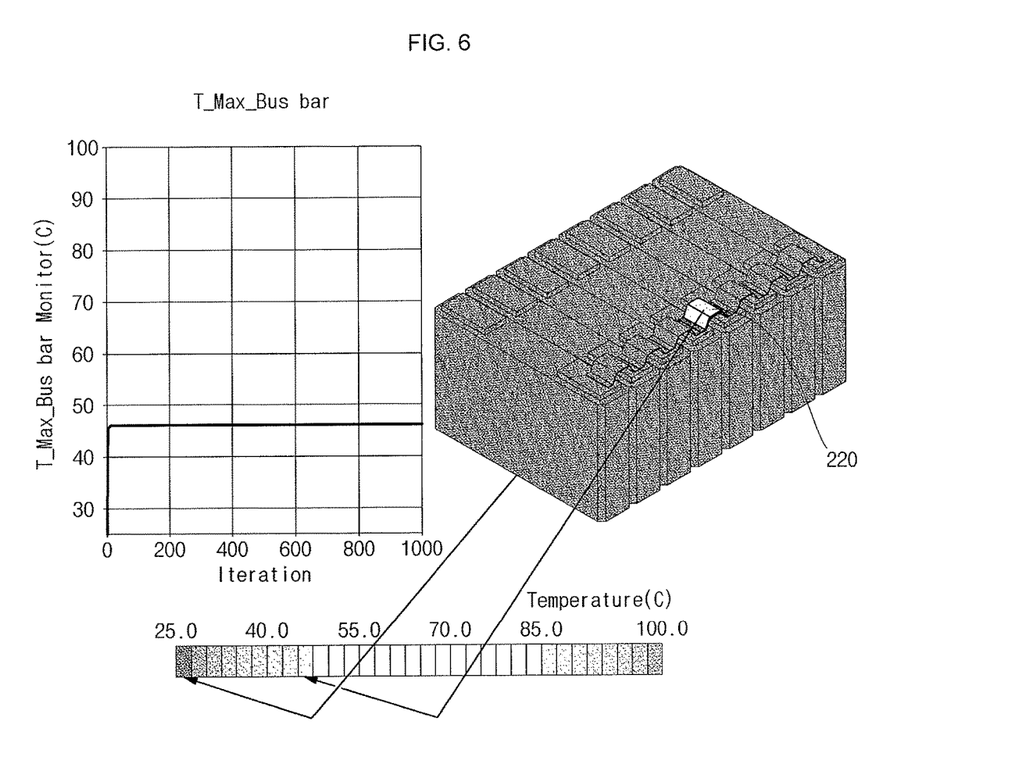
FIG. 6 illustrates an example of a temperature distribution of a bus bar in a battery pack according to one embodiment.

FIG. 1 illustrates an embodiment of a battery pack. FIG. 2 illustrates an embodiment of a secondary battery which, for example, may be included in the battery pack of FIG. 1. FIG. 3 illustrates an embodiment of a bus bar which, for example, may be included in the battery pack of FIG. 1. FIG. 4 illustrates a portion of the battery pack taken along section line A-A' in FIG. 1. FIG. 5 is a graph illustrating an example of a temperature distribution of one type of bus bar. FIG. 6 is a graph illustrating an example of a temperature distribution of a bus bar in a battery pack according to one embodiment.

Referring to FIG. 1, the battery pack 1000 includes a plurality of secondary batteries 110a, 110b, 110c, 110d, 120a, 120b, 120c, 120d, 130a, 130b, 130c and 130d and bus bars 200. The secondary batteries 110a, 110b, 110c, 110d, 120a, 120b, 120c, 120d, 130a, 130b, 130c and 130d are connected to each other in series and in parallel through the bus bars 200.

In one embodiment, the secondary batteries 110a, 110b, 110c, 110d, 120a, 120b, 120c, 120d, 130a, 130b, 130c and 130d constitute parallel groups 110, 120 and 130 connected to each other in parallel, which are then connected to each other in series. Three groups, (e.g., parallel groups 110, 120 and 130) in the battery pack 1000 are illustrated in FIG. 1 for illustrative purposes. The number of parallel groups may be different in another embodiment.

Referring to FIG. 2, one secondary battery 110a (which may be representative of all the secondary batteries) includes an electrode assembly 111 having a first electrode plate and a second electrode plate stacked with a separator therebetween, a case 112 accommodating the electrode assembly 111 and an electrolyte and having a top opening, a cap plate 113 sealing the top opening of the case 112, and a first electrode terminal 114 and a second electrode terminal 115 electrically connected to the first electrode plate and the second electrode plate and protruding outside of the cap plate 113.

The cap plate 113 may include an electrolyte injection hole, a safety vent, and a membrane, and insulating and seal gaskets may be provided between the cap plate 113 and each of the first electrode terminal 114 and the second electrode terminal 115.

Referring to FIGS. 3 and 4, the bus bar 200 may be made from a highly conductive metal material. The bus bar 200 may include a pair of blade portions 200a connected to the first electrode terminal 114 and the second electrode terminal 115 of each of the secondary batteries 110a to 130d, and a bent portion 200b upwardly protruding/bent at the center of the pair of blade portions 200a.

The pair of blade portions 200a may be mounted and fixed on a top surface of the first electrode terminal 114 or the second electrode terminal 115, for example, by a bonding method, e.g., welding. The blade portion 200a of the bus bar 200 and the blade portion 200a of a neighboring bus bar of the bus bar 200 may be spaced a predetermined D1 apart from each other. The space may be sufficient to prevent the bus bar 200 from being deformed during the bonding process of the bus bar 200 and/or due to an externally applied pressure.

The bent portion 200b is at a predetermined location (e.g., the center) between the pair of blade portions 200a in a substantially "n" shape. The bent portion 200b is capable of absorbing vibration applied to the bus bar 200, thereby preventing damage and electrical contact failure.

The bus bar 200 may include first bus bars 210 and 230 and a second bus bar 220. Each of the first bus bars 210 and 230 and the second bus bar 220 may have a pair of blade portions and a bent portion. The bus bars may have similar shapes.

The first bus bar 210 electrically connects the first electrode terminal 114 of the secondary battery 110c and the first electrode terminal 114 of its neighboring secondary battery 110d to each other in a first parallel group 110. In other words, the first bus bar 210 connects the secondary battery 110c and its neighboring secondary battery 110d to each other in parallel.

The first bus bar 230 electrically connects the second electrode terminal 115 of the secondary battery 120a and the second electrode terminal 115 of its neighboring secondary battery 120b to each other in a second parallel group 120. That is to say, the first bus bar 230 connects the secondary battery 120a and its neighboring secondary battery 120b to each other in parallel.

The second bus bar 220 electrically connects the first electrode terminal 114 of the secondary battery 110d in the first parallel group 110 to the second electrode terminal 115 of the secondary battery 120a in the second parallel group 120. That is to say, the second bus bar 220 connects the first parallel group 110 and the second parallel group 120 adjacent to the first parallel group 110 to each other in series.

In the battery pack 1000 having series and parallel configurations, the flow of current may concentrate on a series-connected portion of the battery pack 1000 and a high current flows in the series-connected portion.

Accordingly, in one embodiment, the bent portion of the first bus bars 210 and 230 connecting neighboring secondary batteries in parallel may have a first thickness T1, and the bent portion of the second bus bar 220 connecting neighboring parallel groups in series may have a second thickness T2 which is greater than the first thickness T1. As a result, according to one embodiment, resistance of the second bus bar 220 in the series-connected portion on which the flow of current concentrates may be selectively reduced. This may prevent a voltage drop and heat generation from occurring. In addition, since the first bus bars 210 and 230 in the parallel-connected portion, on which the flow of current does not concentrate, are formed to have a relatively smaller thickness, material costs may be reduced.

FIG. 5 is a graph illustrating an example of a change in temperature of the first bus bar 210 having a same sectional area as a parallel-connected portion, after the first bus bar 210 is positioned on a series-connected portion. As shown in FIG. 5, the temperature of the first bus bar 210 positioned on the series-connected portion series-connected portion rises up to approximately 100° C.

FIG. 6 is a graph illustrating an example of a change in temperature of a second bus bar 220 having a relatively large thickness, after the second bus bar 220 is selectively positioned on a series-connected portion in a battery pack according to one embodiment. As shown in FIG. 6, the temperature of the second bus bar 220 positioned on the series-connected portion rises up to approximately 45° C. Thus, a considerable amount of heat is generated due to the current concentrating on the series-connected portion, and the second bus bar 220 having a relatively large sectional area is positioned on the series-connected portion, thereby reducing the resistance of the series-connected portion.

Figure 7:
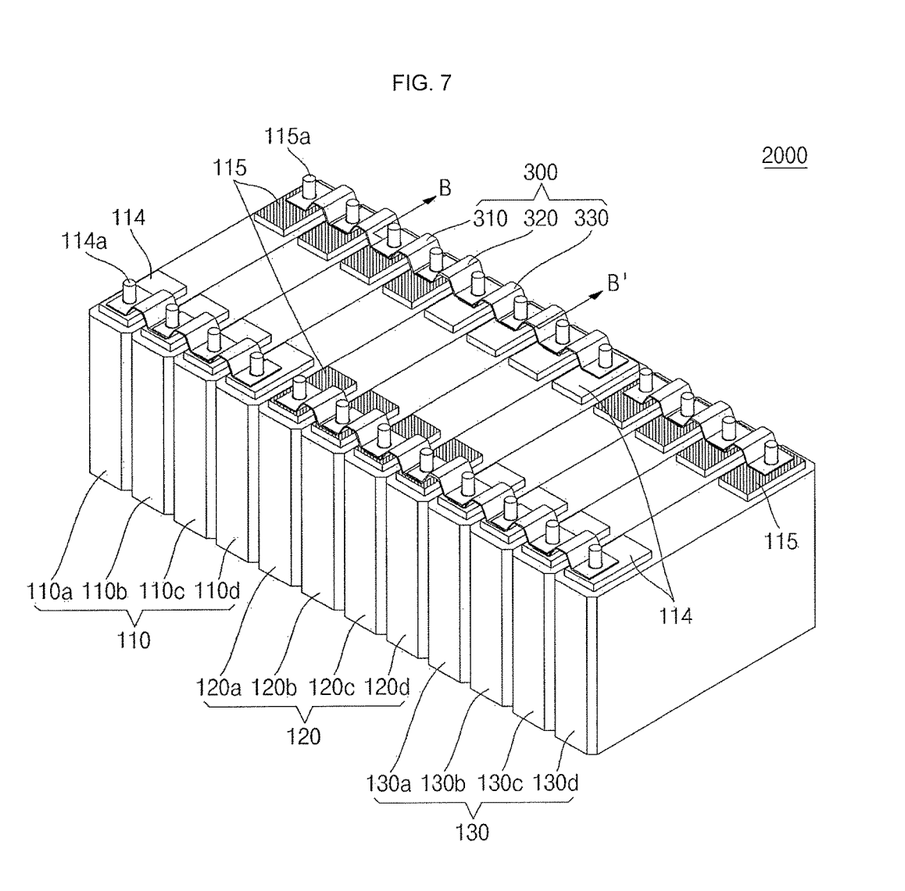
FIG. 7 illustrates another embodiment of a battery pack.
Figure 8:
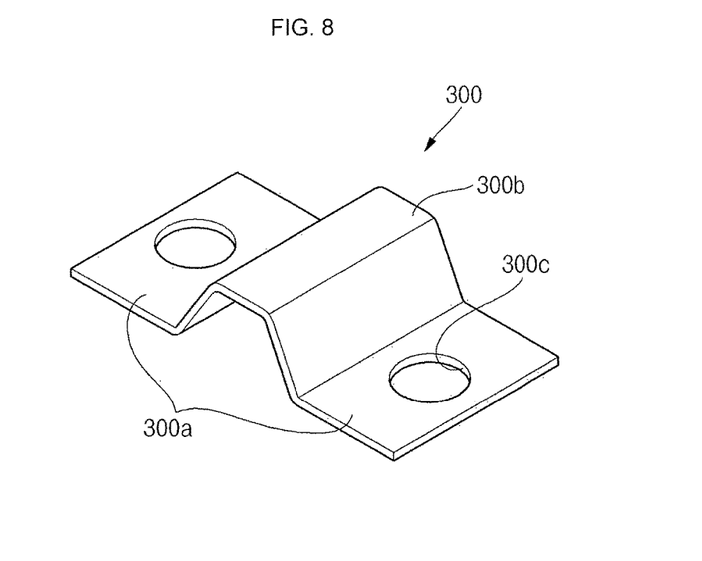
FIG. 8 illustrates another embodiment of a bus bar.
Figure 9:
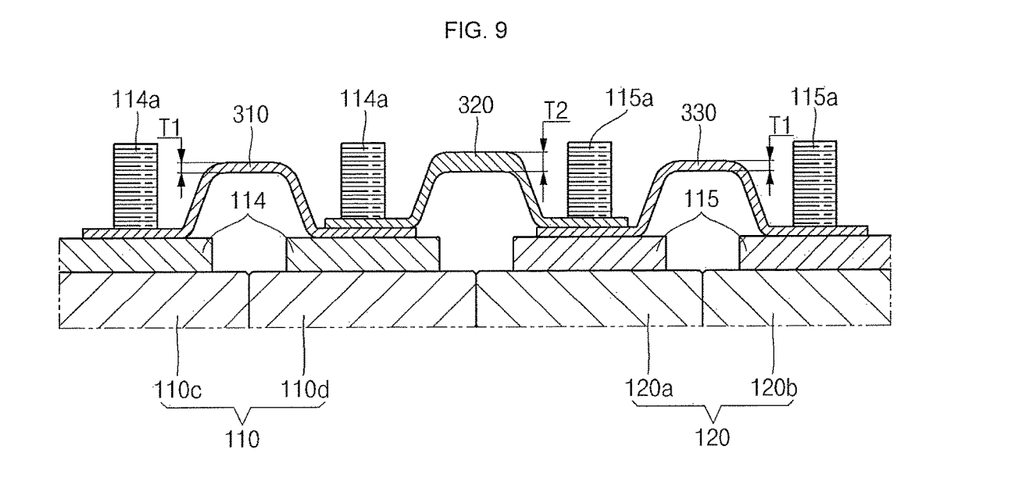
FIG. 9 illustrates a portion of the battery pack along section line B-B' in FIG. 7.

FIG. 7 illustrates another embodiment of a battery pack 2000. FIG. 8 illustrates another embodiment of a bus bar which, for example, may be used in the battery pack 2000. FIG. 9 illustrates a portion of the battery pack along section line B-B' in FIG. 7.

Referring to FIGS. 1 and 7, the battery pack 2000 is different from the battery pack 1000 in view of configurations of fastening terminals 114a and 115a and a bus bar 300. Therefore, the following description of the battery pack 2000 will focus on the fastening terminals 114a and 115a and the bus bar 300.

Referring to FIGS. 8 and 9, the battery pack 2000 includes a plurality of secondary batteries 110a, 110b, 110c, 110d, 120a, 120b, 120c, 120d, 130a, 130b, 130c and 130d and a bus bar 300. The secondary batteries 110a, 110b, 110c, 110d, 120a, 120b, 120c, 120d, 130a, 130b, 130c and 130d are connected to another in series and in parallel through the bus bar 300.

Each of the secondary batteries 110a to 130d includes a first fastening terminal 114a upwardly extending from a first electrode terminal 114 and a second fastening terminal 115a upwardly extending from a second electrode terminal 115. The fastening terminals 114a and 115a are electrically and physically coupled to the first and second electrode terminals 114 and 115, and threads are formed on outer peripheral surfaces of the fastening terminals 114a and 115a.

The bus bar 300 is made of a highly conductive metal material. The bus bar 300 includes a pair of blade portions 300a connected to the first electrode terminal 114 and the second electrode terminal 115 of each of the secondary batteries 110a to 130d, a bent portion 300b upwardly protruding/bent at a predetermined location (e.g., center) of the pair of blade portions 300a, and a penetration hole 300c in each of the pair of blade portions 300a.

The fastening terminals 114a and 115a pass through the penetration hole 300c in each of the pair of blade portions 300a and are then coupled to each other. Nuts or other fasteners are coupled to each other to the fastening terminals 114a and 115a passing through the penetration hole 300c.

A blade portion of the bus bar 300 and a blade portion of its neighboring bus bar 300 are superimposed, and one fastening terminal fastening terminals 114a, 115a passes through the blade portions of the neighboring bus bars 300.

The bus bar 300 includes first bus bars 310 and 330 and a second bus bar 320. Each of the first bus bars 310 and 330 and the second bus bar 320 has a pair of blade portions and a bent portion, which have similar shapes.

The first bus bar 310 electrically connects the first electrode terminal 114 of the secondary battery 110c and the first electrode terminal 114 of its neighboring secondary battery 110d to each other in a first parallel group 110. That is to say, the first bus bar 310 connects the secondary battery 110c and its neighboring secondary battery 110d to each other in parallel.

The first bus bar 330 electrically connects the second electrode terminal 115 of the secondary battery 120a and the second electrode terminal 115 of its neighboring secondary battery 120b to each other in a second parallel group 120. That is to say, the first bus bar 330 connects the secondary battery 120a and its neighboring secondary battery 110d to each other in parallel.

The second bus bar 320 electrically connects the first electrode terminal 114 of the secondary battery 110d in the first parallel group 110 and the second electrode terminal 115 of the secondary battery 120a to each other in the second parallel group 120 adjacent to the first parallel group 110. That is to say, the second bus bar 320 connects the first parallel group 110 and the second parallel group 120 adjacent to the first parallel group 110 to each other in series.

In the battery pack 2000 having series and parallel configurations, the flow of current concentrates on a series-connected portion of the battery pack 2000 and a high current flows in the series-connected portion.

Accordingly, in another embodiment, the bent portion of the first bus bars 310 and 330 connecting neighboring secondary batteries in parallel has a first thickness T1, and the bent portion of the second bus bar 320 connecting neighboring parallel groups in series has a second thickness T2 greater than the first thickness T1.

Therefore, according to the present embodiment, resistance of the second bus bar 320 in the series-connected portion, on which the flow of current concentrates, may be selectively reduced, thereby preventing a voltage drop and heat generation. In addition, since the first bus bars 310 and 330 in the parallel-connected portion, on which the flow of current does not concentrate, are not formed to have relative large thicknesses, material costs may be reduced.

Figure 10:
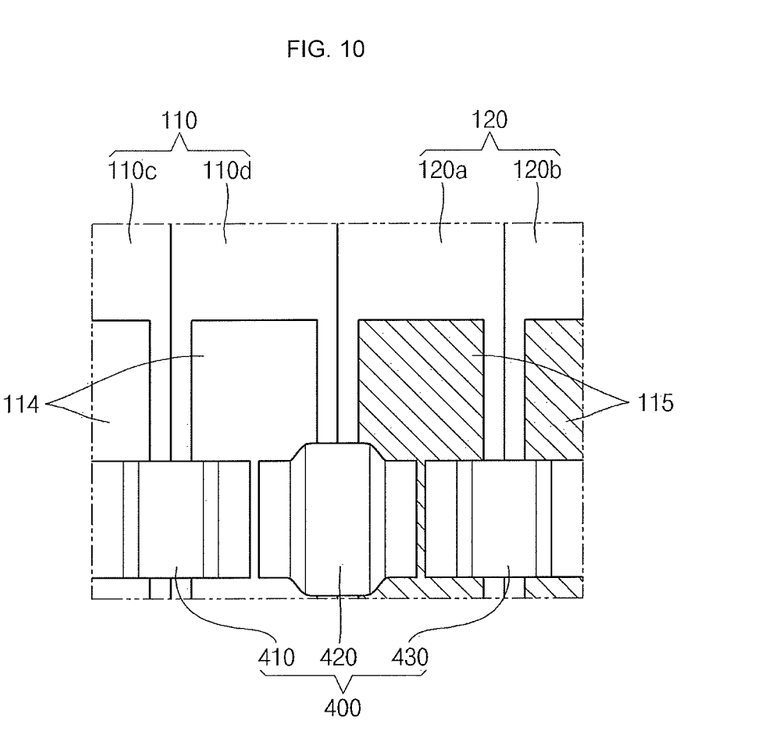
FIG. 10 illustrates another embodiment of a battery pack.
Figure 11:
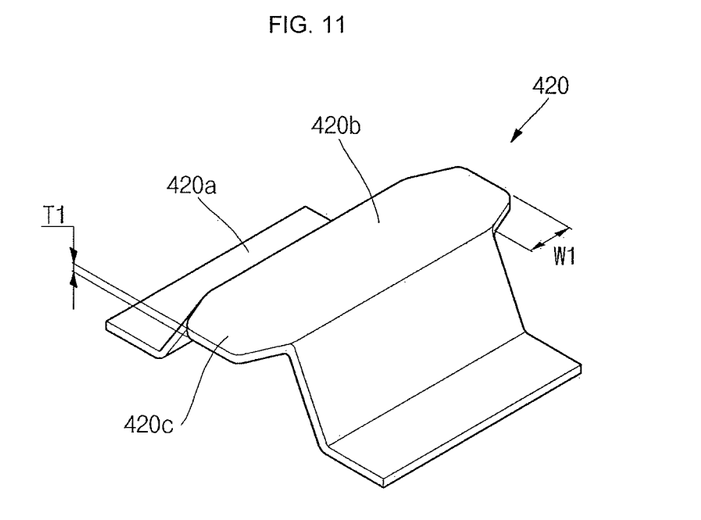
FIG. 11 illustrates another embodiment of a bus bar.

FIG. 10 illustrates another embodiment of portion of a battery pack, and FIG. 11 illustrates another embodiment of a bus bar which, for example, may be used in the battery pack of FIG. 10.

Referring to FIGS. 10 and 11, the battery pack is different from the battery pack 1000 in view of a configuration of a bus bar 400. Therefore, the following description will focus on the bus bar 400.

The bus bar 400 is made of a highly conductive metal material and includes first bus bars 410 and 430 and a second bus bar 420. The first bus bar 410 electrically connects a first electrode terminal 114 of a secondary battery 110c and a first electrode terminal 114 of its neighboring secondary battery 110d to each other in a first parallel group 110. That is to say, the first bus bar 410 connects the secondary battery 110c and its neighboring secondary battery 110d to each other in parallel.

The first bus bar 430 electrically connects a second electrode terminal 115 of a secondary battery 120a and a second electrode terminal 115 of its neighboring secondary battery 120b to each other in a second parallel group 120. That is to say, the first bus bar 430 connects the secondary battery 120a and its neighboring secondary battery 120b to each other in parallel.

The second bus bar 420 electrically connects the first electrode terminal 114 of the secondary battery 110d in the first parallel group 110 to the second electrode terminal 115 of the secondary battery 120a in the second parallel group 120. That is to say, the second bus bar 420 connects the first parallel group 110 and the second parallel group 120 adjacent to the first parallel group 110 to each other in series.

The first bus bars 410 and 430 may have the same shape as the first bus bars 210 and 230 of the battery pack 1000. For example, the first bus bars 410 and 430 include a pair of blade portions connected to the first electrode terminal 114 and the second electrode terminal 115 of each of the secondary batteries 110a to 130d, and a bent portion upwardly protruding/bent at the center of the pair of blade portions and having a first thickness T1.

The second bus bar 420 includes a pair of blade portions 420a connected to the first electrode terminal 114 in the first parallel group 110 and the second electrode terminal 115 in the second parallel group 120, a bent portion 420b upwardly protruding/bent at the center of the pair of blade portions 420a, and an extending portion 420c extending from the bent portion 420b. The pair of blade portions 420a may be mounted and fixed on a top surface of the first electrode terminal 114 or the second electrode terminal 115, for example, by a bonding method, e.g., welding.

The bent portion 420b is formed at a predetermined location (e.g., center) between the pair of blade portions 420a in a substantially "n" shape. The bent portion 420b is able to absorb vibration applied to the bus bar 420, thereby preventing damages and electrical contact failures. The bent portion 420b may have a first thickness T1.

The extending portion 420c extends from bent portion 420b by a first width W1 in a direction perpendicular to extending directions of the pair of blade portions 420a. The extending portion 420c may have the first thickness T1.

Thus, since the second bus bar 420 of the battery pack has the width W1, which is greater than widths of the first bus bars 410 and 430, resistance of the second bus bar 420 in a series-connected portion on which the flow of current concentrates may be selectively reduced, thereby preventing a voltage drop and heat generation. In addition, since the first bus bars 410 and 430 in a parallel-connected portion on which the flow of current does not concentrate are not formed to have relatively large thicknesses, material costs may be reduced.

Figure 12:
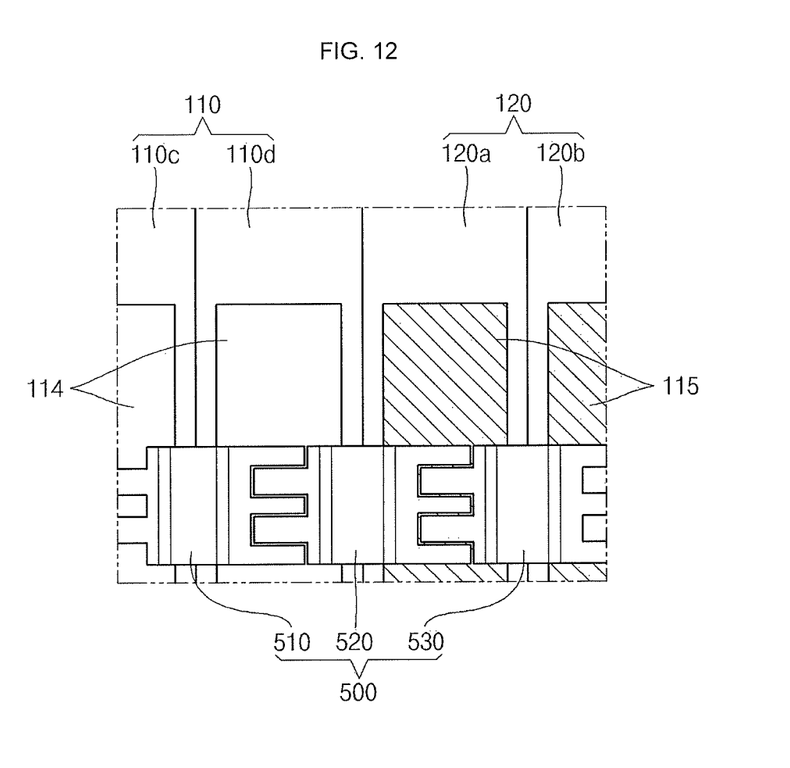
FIG. 12 illustrates another embodiment of a battery pack.
Figure 13:
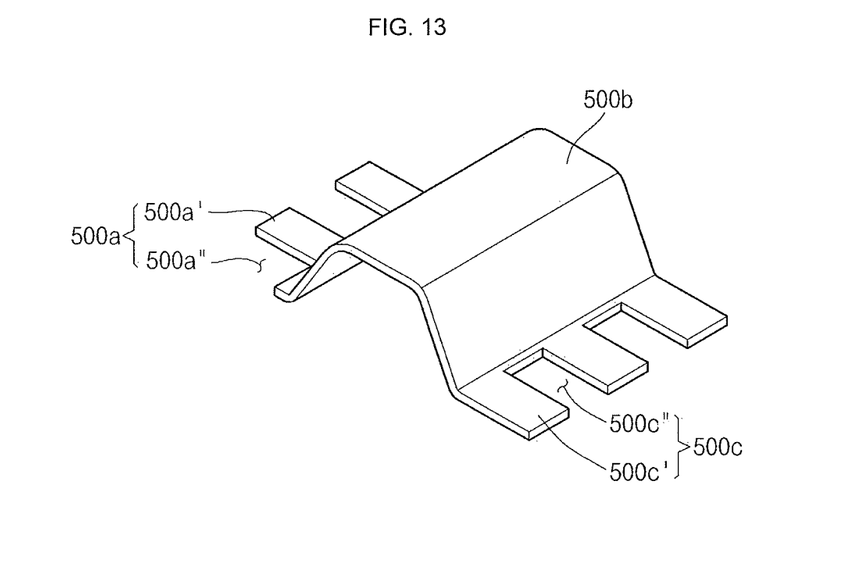
FIG. 13 illustrates another embodiment of a bus bar.
Figure 14:
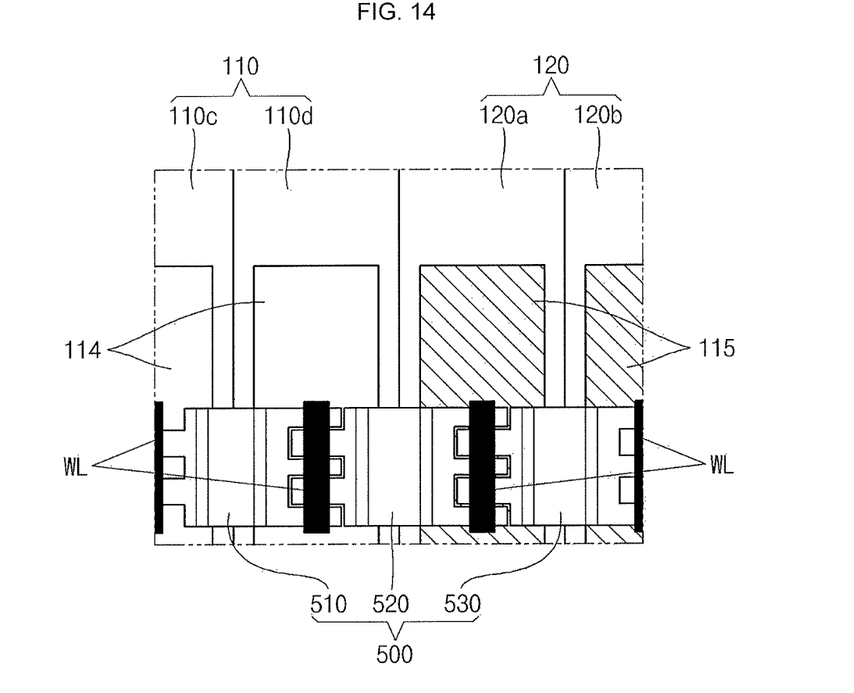
FIG. 14 illustrates an example of a welding line for a bus bar.

FIG. 12 illustrates another embodiment of a battery pack, FIG. 13 illustrates another embodiment of a bus bar which, for example, may be used in the battery pack in FIG. 12, and FIG. 14 illustrates an example of a welding line of the bus bar of FIG. 12.

Referring to FIGS. 12 and 13, the battery pack is different from the battery pack 1000 in view of a configuration of a bus bar 500. Therefore, the following description will focus on the bus bar 500.

The bus bar 500 is made of a highly conductive metal material and includes a first blade portion 500a, a second blade portion 500c and a bent portion 500b. The first blade portion 500a and the second blade portion 500c may be mounted and fixed on a top surface of a first electrode terminal 114 or a second electrode terminal 115, for example, by a bonding method, e.g., welding. The first blade portion 500a includes at least one protrusion 500a' and at least one groove 500a". The second blade portion 500b includes at least one protrusion 500c' corresponding to the groove 500a" of the first blade portion 500a and at least one groove 500c" corresponding to the groove 500a" of the first blade portion 500a.

The protrusion 500a' of the first blade portion 500a of the bus bar 500 is inserted into the groove 500c" of the second blade portion 500c of a neighboring bus bar 500. The protrusion 500c' of the second blade portion 500c of the bus bar 500 is inserted into the groove 500a" of the first blade portion 500a of the neighboring bus bar 500. That is to say, the first blade portion 500a of the bus bar 500 and the second blade portion 500c of the neighboring bus bar 500 engage each other in a serrated shape. Accordingly, as shown in FIG. 14, the bus bar 500 and its adjacent bus bar 500 may be simultaneously welded through a single welding line WL.

The bus bar 500 includes first bus bars 510 and 530 and a second bus bar 520. Each of the first bus bars 510 and 530 and the second bus bar 520 includes a first blade portion, a second blade portion and a bent portion, which have similar shapes.

The first bus bar 510 electrically connects a first electrode terminal 114 of a secondary battery 110c and a first electrode terminal 114 of its neighboring secondary battery 110d to each other in a first parallel group 110. That is to say, the first bus bar 510 connects the secondary battery 110c and its neighboring secondary battery 110d to each other in parallel.

The first bus bar 530 electrically connects a second electrode terminal 115 of a secondary battery 120a and a second electrode terminal 115 of its neighboring secondary battery 120b to each other in a second parallel group 120. That is to say, the first bus bar 530 connects the secondary battery 120a and its neighboring secondary battery 120b to each other in parallel.

The second bus bar 520 electrically connects the first electrode terminal 114 of the secondary battery 110d in the first parallel group 110 and the second electrode terminal 115 of the secondary battery 120a to each other in the second parallel group 120 adjacent to the first parallel group 110. That is to say, the second bus bar 520 connects the first parallel group 110 and the second parallel group 120 adjacent to the first parallel group 110 to each other in series.

In the aforementioned battery pack having series and parallel configurations, the flow of current concentrates on a series-connected portion of the battery pack 2000 and a high current flows in the series-connected portion.

In another embodiment, the bent portion of the first bus bars 510 and 530 connecting neighboring secondary batteries in parallel has a first thickness T1, and the bent portion of the second bus bar 520 connecting neighboring parallel groups in series has a second thickness T2 greater than the first thickness T1. Thus, resistance of the second bus bar 520 in a series-connected portion on which the flow of current concentrates may be selectively reduced, thereby preventing a voltage drop and heat generation. In addition, since the first bus bars 510 and 530 in a parallel-connected portion on which the flow of current does not concentrate are not formed to have relatively large thicknesses, material costs may be reduced.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present embodiments as set forth in the following claims.

What is claimed is:

1. A battery pack, comprising:
 a plurality of secondary batteries connected to each other in series and in parallel, each of the secondary batteries including a first electrode terminal and a second electrode terminal; and
 a plurality of bus bars, each of the bus bars electrically connecting one of the secondary batteries to a neighboring one of the secondary batteries, wherein the bus bars include a first bus bar having a first sectional area and a second bus bar having a second sectional area larger than the first sectional area,
 wherein:
 the secondary batteries are included in at least two parallel groups in which the secondary batteries are connected to each other in parallel,
 the at least two parallel groups are connected to each other in series,
 the first bus bar connects, in parallel, the secondary batteries to each other within each of the parallel groups, and
 the second bus bar electrically connects the at least two parallel groups to each other in series.

2. The battery pack as claimed in claim 1, wherein:
 each of the bus bars includes a pair of blade portions extending from a bent portion, the blade portions connected to a first electrode terminal or a second electrode terminal of each of the secondary batteries.

3. The battery pack as claimed in claim 2, wherein a thickness of the bent portion of the second bus bar is greater than that of the bent portion of the first bus bar.

4. The battery pack as claimed in claim 3, wherein a thickness of the pair of blade portions of the first bus bar is the same as a thickness of the pair of blade portions of the second bus bar.

5. The battery pack as claimed in claim 2, wherein a width of the bent portion of the second bus bar is greater than that of the bent portion of the first bus bar.

6. The battery pack as claimed in claim 5, wherein the second bus bar includes an extending portion extending from the bent portion in a second direction crossing extending directions of the blade portions.

7. The battery pack as claimed in claim 2, wherein a blade portion of one of the bus bars and a blade portion of a neighboring one of the bus bars are spaced apart from each other.

8. The battery pack as claimed in claim 2, wherein:
 each of a first electrode terminal and a second electrode terminal of the secondary battery includes an upwardly extending fastening terminal, and
 each of the blade portions of the bus bars includes a penetration hole through which the fastening terminal passes.

9. The battery pack as claimed in claim 8, wherein:
 a blade portion of one of the bus bars and a blade portion of a neighboring one of the bus bars are superimposed, and
 one fastening terminal passes through the blade portions of both of the bus bar and the neighboring one of the bus bars.

10. The battery pack as claimed in claim 2, wherein:
 the blade portion of the bus bar includes at least one groove and at least one protrusion, and
 the protrusion of the blade portion of the bus bar is inserted into the groove of the blade portion of the neighboring one of the bus bars.

11. The battery pack as claimed in claim 10, wherein the protrusion of the blade portion of the bus bar and the protrusion of the blade portion of the neighboring one of the buss bar are connected to the first electrode terminal or the second electrode terminal of the secondary battery by a single welding line.

12. An apparatus, comprising:
 a first bus bar; and
 a second bus bar,
 wherein the first bus bar is electrically connected to an electrode terminal of a first battery and an electrode terminal of a second battery, and the second bus bar is electrically connected to the electrode terminal of the second battery and an electrode terminal of a third battery,
 wherein the first bus bar has a first section having a uniform first thickness overlapping an interface between the the first and second batteries such that the thickness of the first section at one side of the interface is the same as the thickness of the first section at the other side of the interface,
 wherein the second bus bar has a second section having a uniform second thickness overlapping an interface between the second and third batteries such that the thickness of the second section at one side of the interface is the same as the thickness of the second section at the other side of the interface, and
 wherein the second thickness is different from the first thickness.

13. The apparatus as claimed in claim 12, wherein each of the first and second bus bars include third and fourth sections contacting respective ones of the electrode terminals, and wherein the first and second sections are above the third and fourth sections.

14. The apparatus as claimed in claim 12, wherein the second bus bar connects the electrodes of the second and third batteries in series.

15. The apparatus as claimed in claim 14, wherein the second thickness is greater than the first thickness.

16. The apparatus as claimed in claim 15, wherein the first bus bar does not overlap the second bus bar.

17. The apparatus as claimed in claim 14, wherein the first bus bar overlaps the second bus bar.

* * * * *